Mar. 6, 1923.

H. H. NEFF 1,447,809

APPARATUS FOR SUPPLYING GAS TO INTERNAL COMBUSTION ENGINES

Filed May 12, 1919      2 sheets-sheet 1

Witnesses
JH Crawford.

Inventor
H. H. Neff,
By Victor J. Evans
Attorney

Patented Mar. 6, 1923.

1,447,809

UNITED STATES PATENT OFFICE.

HENRY H. NEFF, OF SALAMANCA, NEW YORK.

APPARATUS FOR SUPPLYING GAS TO INTERNAL-COMBUSTION ENGINES.

Application filed May 12, 1919. Serial No. 296,528.

*To all whom it may concern:*

Be it known that I, HENRY H. NEFF, a citizen of the United States, residing at Salamanca, in the county of Cattaraugus and State of New York, have invented new and useful Improvements in an Apparatus for Supplying Gas to Internal-Combustion Engines, of which the following is a specification.

This invention relates to internal combustion engines, such as marine, aeroplane and automobile engines, the object being to reduce the cost of operation of the engine by the provision of an apparatus which will supply natural gas, either before or after the removal of the gasoline, the apparatus being equally well adapted for the use of gas manufactured from coal.

For this purpose the invention includes a tank in which the gas is stored. This storing may be made at a gas plant direct from a compressor or from independent compressors and is adapted to be conveyed from the tank through a pipe in which is positioned a pressure reducing valve. This pipe conveys the fuel to a second valve, where it is mixed with air and fed to the intake valves of the engine through the manifold, the feed being controlled by the operation of the valve in the usual or any preferred manner.

The invention also includes a novel construction of mixing valve, which is especially adapted for the purpose of feeding fuel of the character above mentioned, the valve being provided with means for regulating the passage of fuel therethrough, so as to obtain the proper mixture of gas and air and for controlling the amount of mixture thus obtained to the engine, so that the speed of the latter may be regulated.

The invention also includes the following novel features and details of construction, to be hereinafter more fully described and illustrated in the accompanying drawings.

Figure 1:
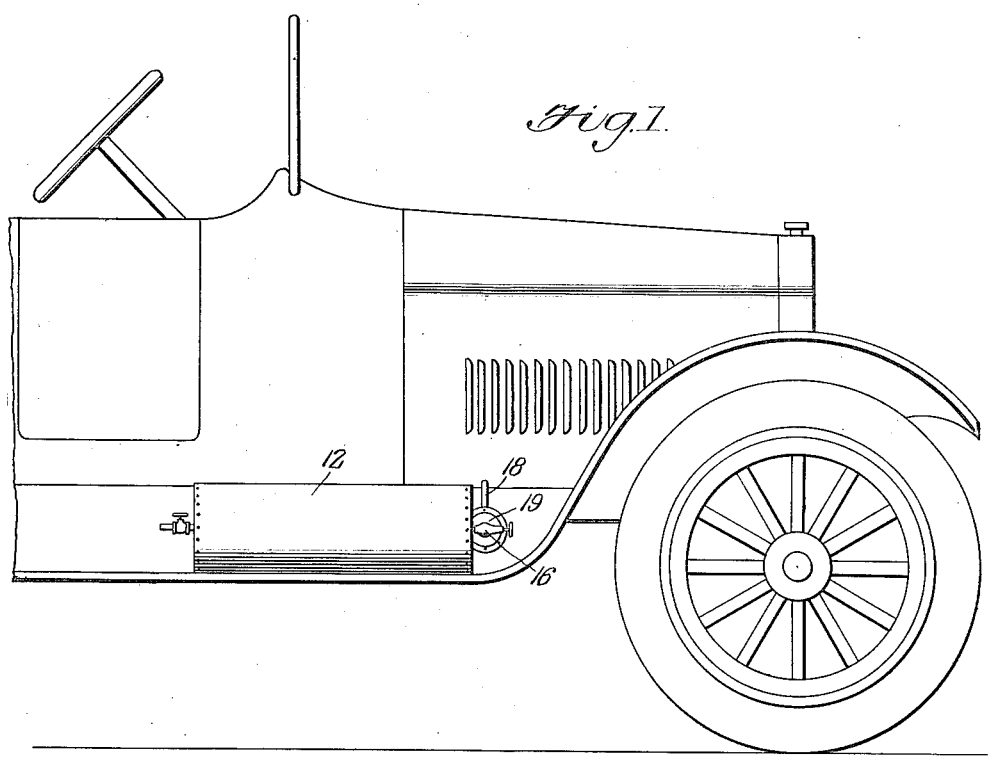
Figure 1 is a side elevation of a portion of a motor vehicle, equipped with an apparatus constituting the present invention.

Referring to the drawings in detail, wherein like characters of reference denote corresponding parts, the engine which is of the internal combustion type, is indicated at 10. This engine is provided with the usual intake manifold 11, and, if desired, the usual carbureter may be connected to the manifold, so that the engine may be operated in the usual manner by the use of gasoline, as well as through the medium of the apparatus hereinafter described and claimed.

In carrying out the present invention, there is provided a fuel storage tank 12, which may be positioned upon a vehicle at any suitable point, the tank being shown in the drawings as mounted upon and secured to the running board adjacent the hood, so as to be in convenient proximity to the engine. Fuel is stored in the tank 12 under a high pressure and in order to withstand this pressure, the tank is reinforced by discs 13, spaced transversely of the tank and provided with openings therein for free passage of the fuel. A pipe 14 extends longitudinally of the tank and is provided with an opening 15, so that the fuel may pass into this pipe and through a shut-off valve 16 connected to one end thereof. The opposite end of the tank is provided with a globe valve for use in filling the tank.

Connected to and communicating with the valve 16, is a pipe 18, and located within the length of this pipe, preferably near the valve 16, is a pressure reducing valve 19. The opposite end of the pipe 18 is provided with an enlargement 20, this end of the pipe being connected to and in communication with a mixing valve 21. To provide for this connection, a nut 22 is threaded around the fuel intake opening 23 of the valve 21 and engages the enlargement 20.

The valve 21 is of novel construction and is especially adapted for the purpose of feeding fuel of the character set forth to an internal combustion engine in proper mixture for use. This valve comprises a casing 24, having therein the fuel intake opening 23 and an air intake opening 25, these openings being separated by a tapered bore 26, which is adapted to receive a rotatably mounted tapered plug 27. This plug is adapted to establish and cut off communication between the inlet openings 23 and 25 and an outlet opening 28, the latter being connected to and communicating with the manifold 11, through the medium of a short pipe section 29. To provide communication between the intake opening 23, the intake opening 25 and the outlet opening 28, the plug 27 is formed with a central bore 30, which communicates at its lower end with the intake opening 23 through the medium of a port 31. This port may be regulated, so as to admit a predetermined quantity of fuel through the medium of a slide 32, operated by means of a threaded rod 33, extending beyond the end of the valve casing. When the port 31 is brought into register with the fuel intake opening 23, the air intake opening will register with a port 34, provided upon the opposite side of the plug, the degree of opening being determined by the position of the plug.

In order to provide a rotary movement for the plug 27, so that the supply of fuel may be regulated, the said plug has connected thereto an arm 35, and this arm may be in turn connected to one end of a rod or lever 36, the latter having its opposite end disposed within convenient reach of the driver of the vehicle and may be operated by a foot control, as shown at 37, or by any other desired means.

Figures 4, 7:
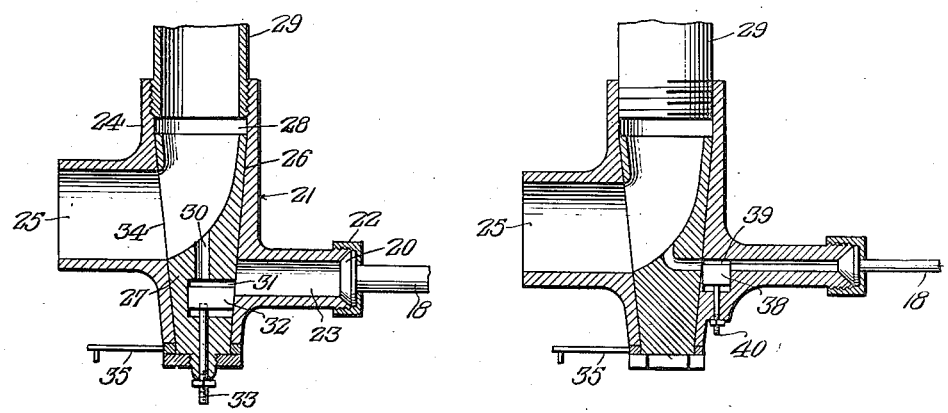
Figure 4 is an enlarged section through the mixing valve.
Figure 7 illustrates a modified form of mixing valve.
Figure 2:
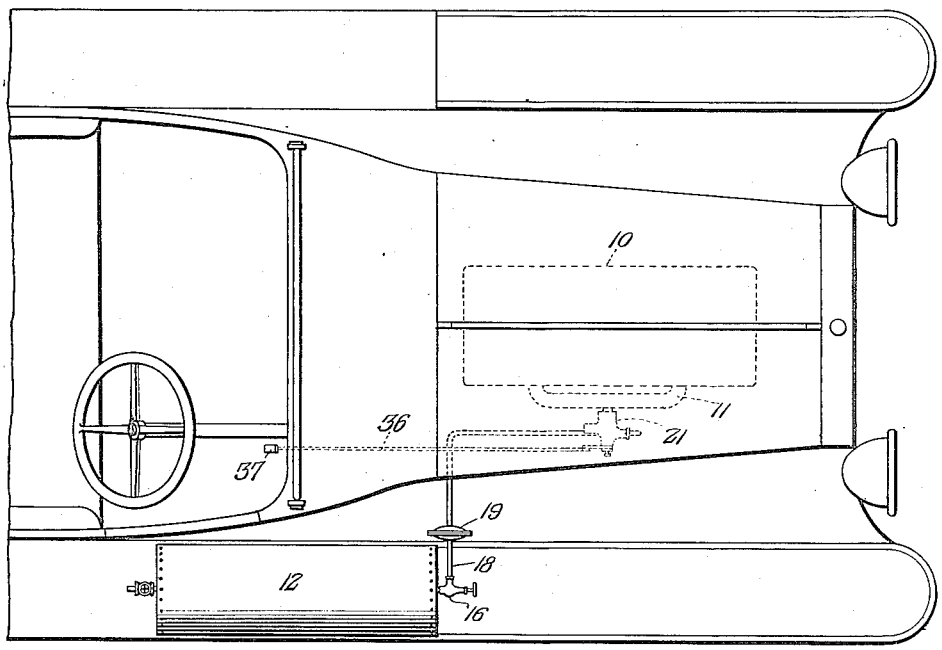
Figure 2 is a plan view of the same.
Figure 3:
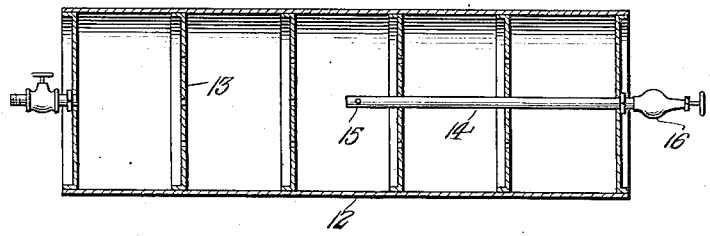
Figure 3 is a longitudinal section through the storage tank.
Figure 5:
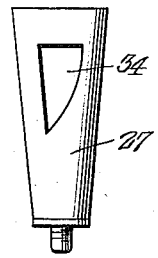
Figure 5 is a detailed elevation of the plug of the mixing valve removed from the casing.
Figure 6:
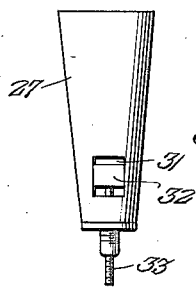
Figure 6 is a similar view looking at the opposite side of the plug.

The form of valve illustrated in Figure 7 is similar in all respects to the valve previously described, except that a slide 38 which regulates the intake of fuel through the intake opening 23, is positioned within a chamber 39, formed in the valve casing 24. Like the slide 32, the slide 38 is regulated through the medium of a threaded rod or screw 40.

It is believed that from the foregoing description and the accompanying drawings, the construction, operation and advantages of the invention will be apparent and the right is herein reserved to make such changes as properly fall within the scope of the appended claims.

Having described the invention, what is claimed is:

1. A mixing valve for internal combustion engines comprising a casing having a central bore, a valve member mounted for rotation therein, an air inlet port, a fuel inlet port, an outlet port, a slide chamber communicating with the fuel inlet port and an independently adjustable slide operating within said chamber for controlling said port.

2. A mixing valve for internal combustion engines comprising a casing having a central bore, a valve member mounted for rotation therein and having a relatively large passage opening at the top and to one side of the valve member, an air inlet port and an outlet port having communication established by said passage, a fuel inlet port, a restricted central passage provided in said valve member to establish communication between the fuel inlet port and the outlet port and a longitudinally adjustable slide for controlling the restricted passage.

3. A mixing valve comprising a casing having an air inlet port and an air outlet port, a rotatable plug in the casing and having a fuel inlet port, said plug having a central bore adapted to establish and cut off communication between the central bore therein and the fuel inlet in the casing, a slide in the port in said plug adapted to regulate the quantity of fuel through the bore, means for adjusting said slide, and means for actuating said plug.

In testimony whereof I affix my signature.

HENRY H. NEFF.